United States Patent [19]
Smith et al.

[11] Patent Number: 6,025,026
[45] Date of Patent: Feb. 15, 2000

[54] PROCESS FOR PRODUCING AN ADHERENT POLYMERIC LAYER ON POLYMERIC SUBSTRATES AND ARTICLES PRODUCED THEREBY

[75] Inventors: Robert A. Smith, Murrysville; Robert W. Walters, Pittsburgh; Kevin J. Stewart; Michael S. Misura, both of Murrysville, all of Pa.

[73] Assignee: Transitions Optical, Inc., Pinellas Park, Fla.

[21] Appl. No.: 09/092,086

[22] Filed: Jun. 5, 1998

Related U.S. Application Data

[60] Provisional application No. 60/051,197, Jun. 30, 1997, and provisional application No. 60/068,372, Dec. 22, 1997.

[51] Int. Cl.$^7$ .............................. B05D 3/02; B05D 3/06; B05D 1/38; C08J 7/12; C08J 7/14
[52] U.S. Cl. ......................... 427/316; 427/322; 427/379; 427/412.1
[58] Field of Search .................... 427/412.1, 316, 427/322, 379

[56] References Cited

U.S. PATENT DOCUMENTS

| | | | |
|---|---|---|---|
| 3,361,706 | 1/1968 | Meriwether et al. | 260/39 |
| 3,707,397 | 12/1972 | Gagnon | 117/72 |
| 3,947,338 | 3/1976 | Jerabek et al. | 204/181 |
| 3,971,872 | 7/1976 | Lebouef | 428/412 |
| 3,984,299 | 10/1976 | Jerabek | 204/181 |
| 4,332,857 | 6/1982 | Taniyama et al. | 428/412 |
| 4,377,530 | 3/1983 | Trenbeath et al. | 260/453 P |
| 4,379,767 | 4/1983 | Alexanian et al. | 260/453 P |
| 4,425,403 | 1/1984 | Taniguchi et al. | 428/331 |
| 4,439,616 | 3/1984 | Singh et al. | 560/25 |
| 4,442,145 | 4/1984 | Probst et al. | 427/385.5 |
| 4,615,947 | 10/1986 | Goossens | 428/412 |
| 4,656,202 | 4/1987 | Nason et al. | 522/89 |
| 4,720,356 | 1/1988 | Chu | 252/586 |
| 4,769,303 | 9/1988 | Ueno et al. | 430/64 |
| 4,873,029 | 10/1989 | Blum | 264/1.3 |
| 4,904,525 | 2/1990 | Taniguchi et al. | 428/328 |
| 4,931,220 | 6/1990 | Haynes et al. | 252/586 |
| 5,104,692 | 4/1992 | Belmares | 427/164 |
| 5,330,686 | 7/1994 | Smith et al. | 252/586 |
| 5,391,327 | 2/1995 | Ligas et al. | 252/586 |
| 5,576,412 | 11/1996 | Hirata et al. | 528/85 |
| 5,595,789 | 1/1997 | Bier | 427/493 |
| 5,658,501 | 8/1997 | Kumar et al. | 252/586 |

FOREIGN PATENT DOCUMENTS

| | | |
|---|---|---|
| 0 726 138 | 8/1996 | European Pat. Off. . |
| 48-037077 | 11/1973 | Japan . |
| WO 94/13750 | 6/1994 | WIPO . |
| WO 96/34735 | 11/1996 | WIPO . |

OTHER PUBLICATIONS

Brauer, C. M., et al., "Oligomers with pendant isocyanate groups as tissue adhesives: II. Adhesion to bone and other tissues", Journal of Biomedical Materials Research, vol. 23, pp. 753–763 (1989).

Chappelow, C. C., et al., "Design and Development of Isocyanatoacrylates as Dental Adhesives", J Dent Res 75(2), pp. 761–767 (Feb. 1996).

Inagaki, N., *Plasma Surface Modification and Plasma Polymerization*, Technomic Publishing Co., Inc., pp. 1–98 (1996).

Cladwell, J. R., et al., "Surface Treatment of Polycarbonate Films with Amines", J Polymer Sci: Part C, No. 24, pp. 15–23 (1968).

Carey, F. A., *Organic Chemistry*, Second Edition, McGraw–Hill, Inc., p. 814 (1992).

Kita, Y., et al., "Facile and Efficient Synthesis of Carboxylic Anhydrides and Amides Using (Trimethylsilyl)ethoxyacetylene", J.Org.Chem., 1986, 51, pp. 4150–4158.

Thomas, M. R., "Isocyanatoethyl Methacrylate: A Heterofunctional Monomer for Polyurethane and Vinyl Polymer Systems", Organic Coatings and Polymer Science Proceedings, vol. 46, pp. 506–513 (1982).

Hoover, F. W., et al., "Chemistry of Isocyanic Acid. II Reaction with α,β–Unsaturated Ethers", J.Org.Chem., vol. 28, pp. 2082–2085 (1963).

"Isocyanates, Organic", *Ullmann's Encyclopedia of Industrial Chemistry*, Fifth Edition, vol. A14, pp. 611–625 (1989).

Antonucci, J. M., et al., "Isocyanato Urethane Methacrylate Derived from Hydroxyethyl Methacrylate", J Dent Res, 59(1), pp. 35–43 (Jan. 1980).

*Primary Examiner*—Erma Cameron
*Attorney, Agent, or Firm*—Frank P. Mallak; Irwin M. Stein

[57] ABSTRACT

Described is a process for producing adherent layer(s) on organic polymeric substrates following the steps of (a) treating the surface of the polymeric substrate to provide reactive groups; (b) applying to the surface a polymerizable composition of organic anhydrides, isocyanates and/or a mixture thereof that is substantially free of organosiloxanes; and (c) curing the polymerizable coating. Further steps include applying an additional layer which is substantially free of organosiloxanes and that may or may not contain the polymerizable composition of the present invention. Also described are products produced by the process that may be transparent, tinted, tinted and polarized or photochromic.

32 Claims, No Drawings

PROCESS FOR PRODUCING AN ADHERENT POLYMERIC LAYER ON POLYMERIC SUBSTRATES AND ARTICLES PRODUCED THEREBY

CROSS REFERENCE TO RELATED APPLICATIONS

This application claims priority to provisional applications Ser. No. 60/051,197 filed Jun. 30, 1997, and Ser. No. 60/068,372 filed Dec. 22, 1997.

DESCRIPTION OF THE INVENTION

This invention relates generally to the art of applying a polymeric layer, e.g., monomolecular layer, film, coating or overlay, to a polymeric substrate. More particularly, the present invention relates to the process of producing an adherent layer on organic polymeric substrates using a polymerizable composition selected from the group consisting of an organic anhydride, a monomer having a reactive isocyanate group and a vinyl polymerizable double bond and a combination thereof. Most particularly, the present invention relates to adhering a photochromic layer to a polymeric substrate, to the resultant substrate having the photochromic layer adhered thereto, and to optical articles prepared from such photochromic substrates.

Photochromic compounds exhibit a reversible change in color when exposed to light radiation involving ultraviolet rays, such as the ultraviolet radiation in sunlight or the light of a mercury lamp. Various classes of photochromic compounds have been synthesized and suggested for use in applications in which a sunlight-induced reversible color change or darkening is desired. The most frequently suggested classes of photochromic compounds are oxazines, pyrans and fulgides.

It is reported that the outermost surface of most organic polymers is hydrophobic due to a preponderance of nonpolar groups and is therefore difficult to wet. Some polymers have such a low surface energy that it is difficult to formulate coatings that will wet the polymer surface. Many of the conventional coatings, e.g., protective hardcoats, paints, inks and adhesives, applied to polymers are hydrophilic. Consequently, they do not form strong chemical interactions with the hydrophobic surface of the polymer, and therefore do not adhere well to the polymer.

Pretreatment processes are frequently used on polymeric substrates to increase the surface tension of the substrate and provide functional groups to interact with polar groups present in coatings applied to such substrates. It is disclosed in U.S. Pat. No. 4,425,403, column 1, line 57–65, that the adhesion between a substrate and coating material applied to the substrate is improved by various kinds of surface treatments. Such treatments are, for example, a chemical treatment with a strong alkali or oxidizing material, hot air treatment, flame cleaning, irradiation with electromagnetic radiation, corona discharge, activation by cold plasma, and the like.

The use of acrylic compositions as primers for improving the adherence of organopolysiloxane and other curable resin-containing coatings to polymeric surfaces has been disclosed. U.S. Pat. No. 3,707,397 describes a process for providing uniform organopolysiloxane coatings on polycarbonate and acrylic surfaces using partially polymerized thermosettable acrylics as priming materials. U.S. Pat. No. 4,615,947 describes a primer layer containing acrylics homogeneously admixed with an organopolysiloxane constituent. Primer compositions of one or more diacryloyloxy compounds in an organic solvent for use as an adhesive inner layer to bond a top-coating finish to a plastic substrate is described in U.S. Pat. No. 4,332,857.

The use of difunctional monomers, i.e., compounds possessing polymerizable double bonds and reactive isocyanate groups, as dental adhesives has been disclosed. See Brauer, C. M., et al "Oligomers with Pendant Isocyanate Groups As Tissue Adhesives:II. Adhesion to Bone and Other Tissues", Journal of Biomedical Materials Research, Vol. 23, pp. 753–763, 1989; and Chappelow, C. C., et al "Design and Development of Isocyanatoacrylates as Dental Adhesives", Journal of Dental Research 75 (2) pp. 761–767, February, 1996.

The use of a coating material possessing cross-linkable components having functional groups has been disclosed. U.S. Pat. No. 5,595,789, describes a method for coating polycarbonate molded parts using coating materials having acrylate, allyl, epoxide, silanol, isocyanate, anhydride or melamine functional groups or combinations thereof.

The use of photochromic compounds in polymerizable materials for forming photochromic layers has been disclosed.

European Patent Application 0 726 138 A1 describes a process for producing a plastic photochromic lens which includes a lens base made of a synthetic resin and a photochromic layer.

International Patent Application WO 96/34735 describes optical articles and methods for producing such articles having an adhesive matrix layer containing one or more photochromic additives.

Although methods exist for obtaining coating adhesion and producing photochromic layers on polymeric substrates, alternative methods are sought. There is a commercial need to produce adherent photochromic and non-photochromic layers on transparent plastic substrates in a rapid and economical manner.

It has now been discovered that an adherent polymer layer on an organic polymeric substrate may be produced in minutes instead of hours by a process that includes the steps of treating the surface of the polymeric substrate to provide reactive groups, applying to the treated surface and curing a polymerizable composition, substantially free of organosiloxanes, selected from the group consisting of an organic anhydride, a monomer having an isocyanate group and a polymerizable double bond and a combination thereof, the resulting layer being at least monomolecular in thickness. In a further embodiment, an additional layer, substantially free of organosiloxanes, prepared from unsaturated monomer formulations, e.g., monomers having acrylic functionality, particularly a photochromic layer, is applied to the first layer and cured. The excluded organosiloxanes are of the type used to form organopolysiloxane coatings described in U.S. Pat. Nos. 3,707,397 and 4,615,947.

It has also been discovered that use of an organic anhydride, a monomer having an isocyanate group and a polymerizable double bond or a combination thereof, as a component of a layer-forming polymerizable formulation, substantially free of organosiloxanes, that also contains unsaturated monomer(s) improves adhesion of such layer to a substrate that has been treated to form reactive groups, or treated with an adhesion promoting layer as described above. In this embodiment, the layer applied to the treated substrate may also contain a photochromic compound. It has further been discovered that heating a tinted and/or tinted and polarized substrate prior to application of the adherent layer described above, minimizes the reduction of tint due to reaction with the components of the adherent layer.

DETAILED DESCRIPTION OF THE INVENTION

A contemplated embodiment of the process of the present invention comprises the following steps:

(a) treating the surface of a organic polymeric substrate to provide reactive groups at said surface;

(b) applying to the surface of said substrate a polymerizable composition, substantially free of organosiloxanes, comprising component(s) selected from the group consisting of:

(1) organic anhydrides having at least one polymerizable ethylenic linkage;

(2) isocyanates:
  (i) isocyanate represented by the following general formula IA:

$$CH_2=C(Y)-C(O)OR'-N=C=O \qquad IA$$

wherein Y is selected from the group consisting of hydrogen and $C_1-C_5$ alkyl; and R' is a $C_1-C_{20}$ alkylene or phenylene;
  (ii) m-isopropenyl-α, α-dimethyl benzyl isocyanate;
  (iii) product of the reaction of an acrylic functional monomer(s) containing a vinyl ether group and isocyanic acid;
  (iv) product of the reaction of unsaturated monomer(s) having a further functional group selected from the group consisting of amino, hydroxy, thio and a combination of said functional groups with isocyanate-containing compound(s) having at least two functional isocyanate groups; and
  (v) mixtures thereof; and (3) combinations of such anhydrides and isocyanates; and (c) curing the applied polymerizable composition, thereby to form an adherent layer that is at least monomolecular in thickness. Optionally, catalyst and photochromic compound(s) may be included in the polymerizable composition.

A further embodiment of the invention comprises the steps of superimposing a further layer on the cured layer of step (c) above by applying an additional polymerizable composition, substantially free of organosiloxanes, comprising at least 5 weight percent, based on the total weight of said polymerizable composition, of a non-functional unsaturated monomer(s), preferably acrylic functional monomer(s), to said cured layer and curing said additional applied composition. The non-functional unsaturated monomers are defined herein as unsaturated monomers substantially free of functional groups selected from the group consisting of amino, hydroxy, thio and/or combinations thereof. The additional polymerizable composition may be applied after the cured initial adherent layer is rinsed with solvent, e.g., acetone, to remove any excess of the adhesion promoting layer material. The additional polymerizable composition may further comprise the anhydrides (1), isocyanates (2) or combinations thereof (3), and in one contemplated embodiment is a polymerizable composition containing photochromic material(s).

The aforedescribed embodiments may include the use of a tinted and/or tinted and polarized transparent organic polymeric substrates which are pre-heated prior to application of the adherent layers. The tinted substrate may be heated to temperatures below which the substrate is damaged due to heating for a tint-stabilizing length of time, i.e., the interval of time necessary to result in a reduced loss of tint after application of the adherent layer, as compared to a tinted substrate that was not heated. Reduction in tint is measured by determining the ΔY, i.e., the difference in the luminous transmittance, Δa* and Δb*, i.e., the difference in color values, measured before and after application of the adherent layer, as described in Example 5 Part E herein. For example, a tinted and polarized substrate may be heated up to 125° C. for less than an hour.

In an optional embodiment of the present invention, the polymerizable composition of step (b), which comprises the anhydrides (1), isocyanates (2) or combinations thereof (3), may further comprise at least 5 weight percent, based on the total weight of said composition, of a non-functional unsaturated monomer(s), preferably acrylic functional monomer(s), with or without photochromic material(s).

The polymerizable compositions of the present invention, whether they form the initial layer on the substrate, or a superposed layer on the initial layer may further comprise additional conventional ingredients that impart desired physical characteristics to the polymerizable composition or the resultant cured layer; that are required for the process used to apply and cure the polymerizable composition to the substrate; and/or that enhance the cured coating layer made therefrom. Such additional ingredients comprise solvents, rheology control agents, plasticizers, leveling agents, e.g., surfactants, catalysts, i.e., polymerization initiators, e.g., thermal and photopolymerization initiators, cure-inhibiting agents and free radical scavengers.

The process of the present invention is used to produce a layer(s) having improved adhesion, i.e., an adherent layer(s), as compared to an identical layer, substantially free of the aforedescribed organic anhydrides, isocyanates and mixtures thereof, as measured by ASTM D-3359-93 (Standard Test Method for Measuring Adhesion by Tape Test-Method B). Preferably, the adherent layer(s) produced by the process of the present invention are transparent. The term "transparent" is intended to mean that the adherent layer does not substantially change the percentage of visible light transmitted through a transparent polymeric substrate to which it is applied.

The amount of the polymerizable composition of the present invention necessary to produce an adherent layer is an adhesion improving amount. The weight percent of the organic anhydrides, isocyanates and mixtures thereof in the polymerizable composition may vary from less than 1 percent up to 100 percent, e.g., from 0.1 to 99.9 weight percent. Depending on how the polymerizable composition is used, the adhesion improving amount may range from 0.1 to 10, 1 to 20, 2 to 50, 5 to 60, 10 to 95 and 50 to 99.9 weight percent. For example, if the polymerizable composition is used as an adhesion promoting layer for a subsequently applied layer, the anhydride, isocyanates and mixtures thereof may be used at a level up to 100 weight percent, e.g., from 50 to 99.9 weight percent. When the polymerizable composition is used as a component of a layer either subsequently applied to the adhesion promoting layer or applied as a single layer in place of an adhesion promoting layer, it typically will be used in the range from 1 to 10 weight percent but may be used at a level up to 95 weight percent based on total weight of the polymerizable composition.

The initial or first layer produced by the process of the present invention is a film or coating prepared from a polymerizable composition, substantially free of organosiloxanes, comprising component(s) selected from the group consisting of organic anhydrides, isocyanates and mixtures thereof, or a coating or overlay prepared from a composition comprising a combination of the polymerizable components and at least 5 weight percent of a non-functional unsaturated monomer(s), preferably acrylic functional monomer(s). The coating or overlay of the initial layer may contain photochromic material(s). The superposed layer, e.g., a further coating or overlay, applied onto the initial film or coating comprises a polymerizable composition, substantially free of organosiloxanes, of at least 5 weight percent non-functional unsaturated monomer(s), preferably, an acrylic functional monomer with or without the polymerizable component, i.e., organic anhydrides, isocyanates and/or mixtures thereof, and with or without photochromic materials(). As used and as defined herein, a film is a layer having a thickness ranging from that of a monomolecular layer to 1 micron. The thickness of a coating can range from 1 micron to 50 microns and the thickness of an overlay can range from 50 to 1,000 microns.

Other than in the operating examples, or where otherwise indicated, all numbers expressing quantities, ratios, ranges, etc. used herein are to be understood as modified in all instances by the term "about".

Treatment of the surface of the organic polymeric substrate to provide reactive groups may be obtained by employing a variety of methods known in the art. Such methods include: thorough cleaning to remove contaminants, e.g., mold release agents, unreacted monomer components, dirt, grease, etc., to expose reactive groups on the surface; treatment with ultraviolet light; and hydroxylation with an aqueous solution of strong alkali, e.g., sodium hydroxide or potassium hydroxide, which solution may also contain a fluorosurfactant. See U.S. Pat. No. 3,971,872, column 3, lines 13 to 25; and U.S. Pat. No. 5,104,692, column 13, lines 10 to 59, which disclosures are incorporated herein by reference. In one embodiment, a surface having reactive hydroxyl groups may be obtained by immersing the substrate for 3 minutes in a 12.5 weight percent aqueous sodium hydroxide solution.

Effective cleaning techniques for removing surface contaminants and exposing reactive groups already present on the surface of polymers, i.e., plastics, such as those prepared from CR-39® diethylene glycol bis(allyl carbonate) monomer or thermoplastic polycarbonate, e.g., a resin derived from bisphenol A and phosgene, include plasma treatment, ultrasonic cleaning, washing with an aqueous mixture of organic solvent, e.g., a 50:50 mixture of isopropanol: water or ethanol: water, and surfactant formulations such as MICRO® Liquid Laboratory Cleaner, available from International Products corporation. Such techniques may be used to clean the surface prior to a surface treatment to produce reactive groups.

Treatment with plasma or activated gas, i.e., treatment with ions, electrons or excited gas which are generated under normal or reduced pressure may be used to produce a variety of reactive groups, e.g., amino, hydroxyl and thiol groups, using ammonia, oxygen and hydrogen sulfide gases, respectively. Examples of ways to generate activated gas include corona discharge, high voltage discharge by using direct electric current, low frequency wave, high frequency wave or microwave under reduced pressure. See U.S. Pat. No. 4,904,525, column 6, lines 10 to 40, which is incorporated herein by reference. Methods for producing reactive groups with plasma are described by Inagaki, N., *Plasma Surface Modification and Plasma Polymerization*, Technomic Publishing Co., Inc., pp. 1–98, 1996, which disclosure is incorporated herein by reference.

Another surface treatment that is reported to produce reactive groups by cleaving the molecular structure of the organic polymeric substrate is the treatment of polycarbonate substrates with primary and secondary amines to form urethane groups. See, "Surface Treatment of Polycarbonate Films with Amine", by Caldwell, J. R., et al, Journal of Polymer Science: Part C No. 24, pp. 15–23, 1968, which disclosure is incorporated herein by reference.

Suitable anhydrides that may be used in the polymerizable composition(s) of the present invention are organic anhydrides having at least one polymerizable ethylenic linkage. Exclusive of the carbon atoms associated with the anhydride moiety, such anhydrides contain from 2 to 30 carbon atoms. Examples include aliphatic, cycloaliphatic, olefinic, cycloolefinic and aromatic anhydrides. Such anhydrides may also be substituted provided that the substituents do not adversely effect the reactivity of the anhydride. Examples of substituents include chloro, alkyl, alkoxy, acryloxy, methacryloxy and allyl. Preparation of acid anhydrides that are not commercially available is customarily done by reaction of acyl chloride with carboxylic acid. This reaction can be used to make both symmetrical and asymmetrical anhydrides as described by Francis A. Carey, *Organic Chemistry*, McGraw-Hill, Inc., 1992, page 814, incorporated herein by reference. Another method for preparing carboxylic anhydrides is that of Yasuyuki Kita, et al, "Facile and Efficient Synthesis of Carboxylic Anhydrides and Amides Using (Trimethylsilyl)ethoxyacetylene", J. Org. Chem., 1986, 51, pages 4150–4158, which is incorporated herein by reference.

Examples of suitable organic anhydrides include acrylic anhydride, methacrylic anhydride, maleic anhydride, itaconic anhydride, allyl succinic anhydride, 4-methacryloxyethyl trimellitic anhydride, tetrahydrophthalic anhydride, dodecenyl succinic anhydride, isobutenyl succinic anhydride, and mixtures of such anhydrides. Preferably, the organic anhydrides are selected from the group consisting of acrylic anhydride, methacrylic anhydride, maleic anhydride, itaconic anhydride and mixtures of such anhydrides.

Suitable isocyanates that may be used in the polymerizable composition(s) of the present invention should have at least one reactive isocyanate group and at least one polymerizable double bond. An example of a compound represented by general formula I A is isocyanatoethylmethacrylate. Methods for preparation of such a compound have been disclosed by Thomas, Mary R., in "Isocyanatoethyl Methacrylate: A Heterofunctional Monomer for Polyurethane and Vinyl Polymer Systems", Organic Coatings and Polymer Science Proceedings, Volume 46, pp. 506–513, 1982, which is incorporated herein by reference. Methods for preparation of m-isopropenyl-α, α-dimethyl benzyl isocyanate are disclosed in U.S. Pat. Nos. 4,377,530; 4,379,767; and 4,439,616, which disclosures are incorporated herein by reference. Methods for preparation of a product of the reaction of an acrylic functional monomer containing a vinyl ether group and isocyanic acid, e.g., 1-(2-methacryloxyethoxy)ethyl isocyanate, have been disclosed by Hoover, F. W., et al., in "Chemistry of Isocyanic Acid. II. Reaction with α, β-Unsaturated Ethers", Journal of Organic Chemistry, Volume 28, pp. 2082–2085, 1963, which is incorporated herein by reference.

When the isocyanates used are the reaction products of unsaturated monomer(s), preferably acrylic monomer(s), having a functional group selected from the group consisting of amino, hydroxy, thio and a combination of said functional groups with an isocyanate-containing compound having at least two functional isocyanate groups, the relative amounts of the ingredients are typically expressed as a ratio of the available number of isocyanate groups to the sum of the available number of reactive amino, hydroxy and/or thio groups, i.e., an equivalent ratio of NCO:NH$_2$,OH and/or SH. The isocyanates of the present invention include an equivalent ratio of NCO:NH$_2$,OH and/or SH ranging between 1.1:1.0 to 7.0:1.0, preferably, 1.5:1.0 to 6.0:1.0, more preferably, 2.0:1.0 to 5.0:1.0, and most preferably, 2.0:1 to 3.0:1.0.

The isocyanates of the present invention, as defined herein, include "modified" or "unmodified" isocyanates having "free", "blocked" or partially blocked isocyanate groups. The isocyanate-containing compounds used in the reaction with the unsaturated monomers having functional groups to produce the isocyanates of the present invention may have free or partially blocked isocyanate groups provided that a free isocyanate group is available to react with a functional group of the unsaturated monomer. The resulting reaction product may have free, blocked or partially blocked isocyanate groups.

The isocyanate-containing compounds may be selected from the group consisting of aliphatic, aromatic, cycloaliphatic and heterocyclic isocyanates and mixtures of such isocyanates. The term "modified" is defined herein to mean that the aforementioned isocyanate-containing compounds are changed in a known manner to introduce biuret, urea, carbodiimide, urethane or isocyanurate groups. In some cases, the "modified" isocyanate-containing compound is obtained by cycloaddition processes to yield dimers and trimers of the isocyanate, i.e., polyisocyanates. Other methods for modifying the isocyanates are described in Ullmann's Encyclopedia of Industrial Chemistry, Fifth Edition, 1989, Vol. A14, pages 611 to 625, and in U.S. Pat. No. 4,442,145 column 2 line 63 to column 3 line 31, which disclosures are herein incorporated by reference.

Free isocyanate groups are not stable, i.e., the isocyanate groups will react with water or compounds that contain reactive hydrogen atoms. In order to provide stable and storable isocyanates and/or isocyanate-containing compounds, the NCO groups may be blocked with certain selected organic compounds that render the isocyanate group inert to reactive hydrogen compounds at room temperature. When heated to elevated temperatures, e.g., between 90 and 200° C., the blocked isocyanates release the blocking agent and react in the same way as the original unblocked or free isocyanate. The isocyanates can be fully blocked, as described in U.S. Pat. No. 3,984,299, column 1, lines 1 to 68, column 2 and column 3, lines 1 to 15, or partially blocked and reacted with the polymer backbone, as described in U.S. Pat. No. 3,947,338, column 2, line 65 to column 4, line 30, which disclosures are incorporated herein by reference.

As used herein, the NCO in the NCO:NH$_2$,OH and/or SH ratio represents the free or reactive isocyanate of the free isocyanate-containing compounds and blocked or partially blocked isocyanate-containing compounds after the release of the blocking agent. In some cases, it is not possible to remove all of the blocking agent. In those situations, more of the blocked isocyanate-containing compound would be used to attain the desired level of free NCO.

The isocyanate-containing compounds may also include the polyiso(thio)cyanate compounds disclosed in U.S. Pat. No. 5,576,412. The disclosure relating to such polyiso(thio)cyanate compounds is herein incorporated by reference.

Preferably, the isocyanate-containing compound is selected from the modified or unmodified-group of compounds consisting of aliphatic isocyanates, cycloaliphatic isocyanates, aromatic isocyanates, partially blocked aliphatic isocyanates, partially blocked cycloaliphatic isocyanates, partially blocked aromatic isocyanates and mixtures of such isocyanates. More preferably, the isocyanate is selected from the modified group consisting of aliphatic isocyanates, cycloaliphatic isocyanates, aromatic isocyanates and mixtures thereof. Most preferably, the isocyanate component is an unmodified aliphatic isocyanate, e.g., an isophorone diisocyanate.

Generally, compounds used to block the isocyanates are volatile alcohols, epsilon-caprolactam or ketoxime compounds. More specifically, the blocking compounds may be selected from the group consisting of phenol, cresol, nonylphenol, epsilon-caprolactam and methyl ethyl ketoxime. Preferably, the blocking compound is methyl ethyl ketoxime.

Suitable isocyanate-containing compounds having at least two functional isocyanate groups include modified or unmodified members of the group consisting of: toluene-2, 4-diisocyanate; toluene-2,6-diisocyanate; diphenyl methane-4,4'-diisocyanate; diphenyl methane-2,4'-diisocyanate; paraphenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethyl hexane-1,6-diisocyanate; lysine methyl ester diisocyanate; bis (isocyanato ethyl) fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; perhydrodiphenylmethane-2,4'-diisocyanate; perhydrodiphenylmethane-4,4'-diisocyanate, naphthylene-1,5-diisocyanate and mixtures thereof.

The unsaturated monomer(s) to be reacted with the isocyanate-containing compounds have functional groups selected from the group consisting of amino, hydroxy, thio and a combination of said functional groups. Examples of such monomers include 3-amino-1-propanol vinyl ether, 1,4-butanediol vinyl ether, allyl alcohol, allyl amine and 4-vinylbenzyl alcohol. Preferably, the unsaturated monomer(s) are acrylic monomer(s), defined herein to include acrylic and methacrylic monomers, having the aforementioned functional groups.

Examples of hydroxy-functional acrylic monomers include 2-hydroxyethyl acrylate, 2-hydroxypropyl acrylate, 3-hydroxypropyl acrylate, 4-hydroxybutyl acrylate, 3,4-dihydroxybutyl acrylate, 6-hydroxyhexyl acrylate, 2-hydroxyethyl methacrylate, 2-hydroxypropyl methacrylate, 3-hydroxypropyl methacrylate, 4-hydroxybutyl methacrylate, 3,4-dihydroxybutyl methacrylate, 6-hydroxyhexyl methacrylate, 3-chloro-2-hydroxypropyl methacrylate and the like, e.g., ethyleneglycol methacrylate and propyleneglycol methacrylate.

Examples of amino-functional substituted acrylic monomers include the ortho, meta, and para substituted aminophenyl acrylates, amino phenethyl acrylate, amino phenheptyl acrylate, p-aminophenoxy acrylate, 2-t-butylaminoethyl acrylate, 2-t-octylaminoethyl acrylate, 7-amino-3,4-dimethyloctyl acrylate, ortho, meta, and para substituted aminophenyl methacrylates, amino phenethyl methacrylate, amino phenheptyl methacrylate, p-aminophenoxy methacrylate, 2-t-butylaminoethyl methacrylate, 2-t-octylaminoethyl methacrylate, 7-amino-3,4-dimethyloctyl methacrylate and the like. An example of a thio-functional acrylic monomer is mercaptoethyl methacrylate.

The additional polymerizable composition that may be applied to the initial layer and cured to produce a superposed layer comprises at least 5 weight percent, based on the total weight of said composition, of a non-functional unsaturated monomer(s), preferably, acrylic functional monomer(s). Preferably, the non-functional unsaturated monomer(s) represent at least 30 weight percent, more preferably, at least 50 weight percent, and most preferably at least 80 weight percent of the monomers used to prepare the additional polymerizable composition. Other monomers, e.g., saturated monomers, non-acrylic functional monomer(s), etc., may be present at a level up to 94 weight percent in the additional polymerizable composition.

Suitable monomers having acrylic functionality, may be selected from the group consisting of monomers represented by the following graphic formula I through IV and mixtures of said monomers.

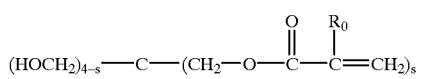

I

In graphic formula I, $R_0$ is hydrogen or methyl, and s is selected from the integers 1–4. Preferably, $R_0$ is methyl and s is 1 or 2. Other diacrylate or dimethacrylate compounds may be represented by graphic formula II,

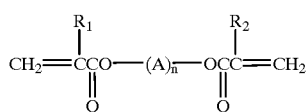

II wherein $R_1$ and $R_2$ may be the same or different and are hydrogen or methyl, A is methylene ($CH_2$) and n is an integer of from 1 to 20. Still other diacrylate or dimethacrylate compounds may be represented by graphic formula III,

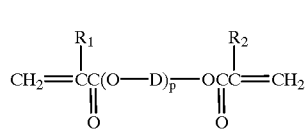

III wherein D is a straight or branched chain alkylene containing from 2 to 4 carbon atoms, p is an integer of from 1 to 50. Acrylate or methacrylate compounds having an epoxy group may be represented by graphic formula IV,

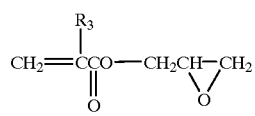

IV wherein $R_3$ is hydrogen or methyl. In graphic formulae II, III and IV, like letters used with respect to the definitions of different substituents have the same meaning.

Examples of acrylate or methacrylate compounds represented by graphic formula I include pentaerythritol di-, tri- and tetra-acrylates or pentaerythritol di-, tri- and tetra-methacrylates. Examples of diacrylate or dimethacrylate compounds, i.e., di(meth)acrylates, represented by graphic formula II include butanediol di(meth)acrylate, hexanediol di(meth)acrylate and nonanediol di(meth)acrylate; and represented by graphic formula III include diethylene glycol dimethacrylate, triethylene glycol dimethacrylate and poly (oxyalkylene dimethacrylates), e.g., polyethylene glycol (600) dimethacrylate. Examples of acrylate or methacrylate compounds represented by graphic formula IV include glycidyl acrylate and glycidyl methacrylate.

Further examples of monomers having acrylic functionality include: ethoxylated bisphenol A dimethacrylate monomers, ethylene glycol bismethacrylate monomers, poly (ethylene glycol) bis methacrylate monomers, polyhydric alcohol polyacrylate monomers, such as trimethylol propane trimethacrylate, ethoxylated phenol bis methacrylate monomers, alkoxylated polyhydric alcohol polyacrylate monomers, such as ethoxylated trimethylol propane triacrylate monomers, urethane acrylate monomers, such as those described in U.S. Pat. No. 5,373,033; polyfunctional, e.g., mono-, di- or multi-functional, acrylate and/or methacrylate monomers, $C_1$–$C_{12}$ alkyl methacrylates, such as methyl methacrylate, alkoxylated phenol methacrylates; polyol [(meth)acryloyl terminated carbonate]monomer, e.g., 2,5,8, 10,13-pentaoxahexadec-15-enoic acid, 15-methyl-9,14-dioxo-2[(2-methyl-1-oxo-2-propenyl)oxy]ethyl ester; acrylated oligomers of epoxies, urethanes, acrylics and polyesters and mixtures of the aforementioned materials that may be used in the preparation of the additional polymerizable composition.

The additional polymerizable composition may further comprise an adhesion improving amount of the aforedescribed organic anhydrides, isocyanates and mixtures thereof. The adhesion improving amount may range from 1.0 to 10.0 weight percent, based on the total weight of the composition; preferably from 1.0 to 8.0 weight percent; more preferably from 1.5 to 5.0 weight percent; and most preferably from 1.5 to 4.5 weight percent, e.g., 2.0 to 4.0 weight percent.

The polymerizable composition comprising the aforedescribed organic anhydrides, isocyanates and mixtures thereof, which are cured to produce the initial layer may further comprise at least 5 weight percent, based on the total weight of said composition, of the aforedescribed non-functional unsaturated monomer(s), e.g., acrylic functional monomer(s). Preferably, the non-functional unsaturated monomer(s) represents at least 30 weight percent, more preferably, at least 50 weight percent, and most preferably at least 80 weight percent of the monomers used in the polymerizable composition. Other monomers, e.g., saturated monomers, non-acrylic functional monomers, etc., may be present at a level up to 94 weight percent.

Suitable catalysts that may optionally be used to accelerate the cure of the polymerizable compositions of the present invention are basic materials and include organic amine catalysts such as piperidine, diethylenetriamine, triethylamine, N,N-dimethyldodecylamine, pyridine, 1,4-diazabicyclo[2.2.2]octane and N,N-dimethylaniline; ammonium compounds including tetramethylammonium halides, e.g., tetramethylammonium chloride and tetramethylammonium iodide, tetramethylammonium acetate, tetramethylbenzylammonium acetate, tetrabutylammonium halides, e.g., tetrabutylammonium fluoride and tetrabutylammonium hydroxide; phosphonium compounds, including ethyltriphenylphosphonium acetate and tetrabutylphosphonium halides, e.g., tetrabutylphosphonium bromide; other ammonium and phosphonium salts; organotin catalysts such as tin octylate, dibutyltin diacetate, dibutyltin dilaurate, dibutyltin mercaptide, dibutyltin dimaleate, dimethyltin diacetate, dimethyltin dilaurate, dimethyltin mercaptide, dimethyltin dimaleate, triphenyltin acetate, triphenyltin hydroxide; and mixtures thereof. The amount of optional catalyst used is typically from 0.01 to 10, preferably 0.1 to 3, percent by weight based on the weight of the polymerizable coating composition.

Suitable solvents that may be present in the polymerizable composition of the present invention are those that will dissolve the solid components of the polymerizable composition and that will be compatible with it and the resultant cured polymer. For example, solvents having reactive hydroxyl and/or amino groups would be incompatible. The minimum amount of solvent present in the polymerizable composition is a solvating amount, i.e., an amount which is sufficient to solubilize the solid components of the polymerizable composition. The maximum amount of solvent that may be present is an amount that still enables preparation of an adherent polymer layer on a polymeric substrate using methods known in the art of coating technology. Depending on the method of application, the amount of solvent may be up to 99 weight percent, based on the weight of the polymerizable composition.

Suitable solvents include, but are not limited to, the following: benzene, toluene, methyl ethyl ketone, methyl isobutyl ketone, acetone, propylene carbonate, N-methyl pyrrolidinone, N-vinyl pyrrolidinone, N-acetyl pyrrolidinone, N-butyl pyrrolidinone, N-ethyl pyrrolidinone, N-(N-octyl) pyrrolidinone, N-(N-dodecyl) pyrrolidinone, 2-methoxyethyl ether, xylene, cyclohexane, 3-methyl cyclohexanone, ethyl acetate, butyl acetate, tetrahydrofuran, amyl propionate, methyl propionate, propylene glycol methyl ether, dimethyl sulfoxide, dimethyl formamide, dialkyl ethers of ethylene glycol and their derivatives (sold as CELLOSOLVE industrial solvents) and mixtures thereof.

Photochromic compounds that may be utilized in the polymerizable composition(s) of the present invention are organic photochromic compounds that may be used individually or in combination with other complementary photochromic compounds, i.e., organic photochromic compounds having at least one activated absorption maxima within the range of between about 400 and 700 nanometers, or substances containing same, that may be incorporated, e.g., dissolved or dispersed, in the polymerizable composition(s) used to prepare the films, coatings or overlay and which compounds or mixtures of compounds color when activated to an appropriate hue.

More particularly, the organic photochromic compounds comprise:

(a) at least one photochromic organic compound having a visible lambda max of from 400 nanometers to 525 nanometers; and (b) at least one photochromic organic compound having a visible lambda max of from greater than 525 nanometers to 700 nanometers. Most particularly, the organic photochromic compounds are naphtho[1,2-b]pyrans.

Examples of suitable photochromic compounds for use in the polymerizable composition of the present invention include benzopyrans, naphthopyrans, e.g., naphtho[1,2-b] pyrans and naphtho[2,1-b]pyrans, spiro(indoline) benzoxazines and naphthoxazines, and spiro(indoline) pyridobenzoxazines. Specific examples include the novel naphthopyrans of U.S. Pat. No. 5,658,501 and the complementary organic photochromic substances disclosed in this patent from column 11, line 57 through column 13, line 36. Other photochromic substances contemplated for use herein are the photochromic metal-dithizonates, e.g., mercury dithizonates which are described in, for example, U.S. Pat. No. 3,361,706; and fulgides and fulgimides, e.g. the 3-furyl and 3-thienyl fulgides and fulgimides, which are described in U.S. Pat. No. 4,931,220 at column 20, line 5 through column 21, line 38.

The disclosures relating to such photochromic compounds in the aforedescribed patents are incorporated herein, in toto, by reference. The photochromic films, coatings or overlay of the present invention may contain one photochromic compound or a mixture of photochromic compounds, as desired. Mixtures of photochromic compounds may be used to attain certain activated colors such as a near neutral gray or brown.

A neutral gray color exhibits a spectrum that has relatively equal absorption in the visible range between 400 and 700 nanometers. A neutral brown color exhibits a spectrum in which the absorption in the 400–550 nanometer range is moderately larger than in the 550–700 nanometer range. An alternative way of describing color is in terms of its chromaticity coordinates, which describe the qualities of a color in addition to its luminance factor, i.e., its chromaticity. In the CIE system, the chromaticity coordinates are obtained by taking the ratios of the tristimulus values to their sum, e.g., $x=X/(X+Y+Z)$ and $y=Y/(X+Y+Z)$. Color as described in the CIE system can be plotted on a chromaticity diagram, usually a plot of the chromaticity coordinates x and y. See pages 47–52 of *Principles of Color Technology*, by F. W. Billmeyer, Jr., and Max Saltzman, Second Edition, John Wiley and Sons, N.Y. (1981). As used herein, a near neutral color is one in which the chromaticity coordinate values of "x" and "y" for the color are within the following ranges (D65 illuminant): $x=0.260$ to $0.400$, $y=0.280$ to $0.400$ following activation to 40 percent luminous transmission by exposure to solar radiation (Air Mass 1 or 2).

Each of the photochromic substances described herein may be used in amounts and in a ratio (when mixtures are used) such that a composition to which the mixture of compounds is applied or in which they are incorporated exhibits a desired resultant color, e.g., a substantially neutral color such as shades of gray or brown when activated with unfiltered sunlight, i.e., as near a neutral color as possible given the colors of the activated photochromic compounds, and exhibits the desired intensity.

The relative amounts of the aforesaid photochromic compounds used will vary and depend in part upon the relative intensities of the color of the activated species of such compounds, the ultimate color desired and the thickness of the adherent layer. Generally, the amount of photochromic substance incorporated into the additional polymerizable composition and/or the polymerizable composition of anhydrides, isocyanates or mixtures thereof may range from 0.1 to 40 weight percent based on the weight of the polymerizable composition. Preferably, the concentration of photochromic substances ranges from 0.5 to 30 weight percent, more preferably, from 0.8 to 20 weight percent, and most preferably, from 1.0 to 15 weight percent, e.g., from 1.2 to 12 weight percent. Depending on the thickness of the adherent layer, different amounts of photochromic compounds may be necessary to achieve the desired intensity. For example, a layer having a thickness of from 5 to 50 microns may require from 15 to 5 weight percent, respectively, based on the total weight of the layer composition, of photochromic compound and a layer having a thickness of from 50 to 500 microns may require from 2.0 to 0.5 weight percent, respectively.

The photochromic compounds described herein may be incorporated into the additional polymerizable composition and/or the polymerizable composition containing the anhydrides, isocyanates or mixtures thereof by various methods described in the art. Such methods include dissolving or dispersing the photochromic substance within the polymerizable compositions, e.g., adding the photochromic substance to the compositions prior to polymerization, imbibition of the photochromic compounds into the adherent layer by immersion of the substrate having an adherent layer in a hot solution of the photochromic substance or by thermal transfer. The term "imbibition" is intended to mean and include permeation of the photochromic substance alone into the adherent layer, solvent assisted transfer of the photochromic substance, vapor phase transfer, and other such transfer mechanisms.

Adjuvant materials may also be incorporated into the polymerizable compositions with the photochromic substances, prior to, simultaneously with or subsequent to application or incorporation of the photochromic substances in the polymerizable compositions or cured coating. For example, ultraviolet light absorbers may be admixed with photochromic substances before their addition to the polymerizable compositions or such absorbers may be superposed, e.g., superimposed, as a layer between the adherent photochromic layer and the incident light. Further, stabilizers may be admixed with the photochromic substances prior to their addition to the polymerizable compositions to improve the light fatigue resistance of the photochromic substances. Stabilizers, such as hindered amine light stabilizers (HALS), asymmetric diaryloxalamide (oxanilide) compounds and singlet oxygen quenchers, e.g., a nickel ion complex with an organic ligand, or mixtures of stabilizers are contemplated. They may be used alone or in combination. Such stabilizers are described in U.S. Pat. Nos. 4,720,356 and 5,391,327, respectively.

In the practical application of the process, the polymerizable compositions used in accordance with the invention may be applied to a transparent, translucent or even opaque organic polymeric material, preferably, transparent, and particularly, thermoset and thermoplastic organic polymeric materials, e.g., thermoplastic polycarbonate type polymers and copolymers and homopolymers or copolymers of a polyol(allyl carbonate).

Application of the polymerizable compositions may be by any of the methods used in coating technology such as, for example, spray coating, spin coating, spread coating, curtain coating, dip coating, casting or roll-coating and methods used in preparing overlays, such as the method of the type described in U.S. Pat. No. 4,873,029, which is incorporated herein by reference. The application method selected also depends on the thickness of the desired layer. Layers having a thickness ranging from a monomolecular layer, i.e., a layer 1 molecule thick to 50 microns may be applied by the methods used in coating technology. Layers of a thickness greater than 50 microns may require molding methods typically used for overlays. The adherent layer(s) may range in thickness from that of a monomolecular layer to 1,000 microns, preferably, from 5 to 500, more preferably, from 8 to 400 and most preferably, from 10 to 250 microns, e.g., a thickness of from 20 to 200 microns.

Following application of the polymerizable composition to the treated surface of the polymeric substrate, the layer is cured. Depending on the composition, the layer may be cured at temperatures ranging from 22° C. to 200° C. If heating is required to obtain a cured layer, temperatures of between 80° C. and a temperature above which the substrate is damaged due to heating, e.g., 80° C. to 150° C., are typically used. For example, certain organic polymeric materials may be heated up to 130° C. for a period of 1 to 16 hours in order to cure the coating without causing damage to the substrate. While a range of temperatures has been described for curing the adherent layer on the substrate, it will be recognized by persons skilled in the art that temperatures other than those disclosed herein may be used. Additional methods for curing the polymerizable compositions include irradiating with infrared, ultraviolet, gamma or electron radiation so as to initiate the polymerization reaction of the polymerizable components in the composition. Typically, the curing of the polymerizable compositions of the present invention will be done in an inert environment, e.g., under vacuum or in a nitrogen or argon atmosphere substantially free of oxygen.

Examples of organic polymeric materials that may be substrates for the polymerizable compositions of the present invention are polymers prepared from individual monomers or mixtures of monomers selected from the aforedescribed acrylates represented by graphic formulae I, II, III and IV. Further examples of organic polymeric materials, e.g., organic optical resins, which may be coated with the polymerizable compositions described herein include: polymers, i.e., homopolymers and copolymers, of the monomers and mixtures of monomers disclosed in U.S. Pat. No. 5,658,501 from column 15, line 28 to column 16, line 17, which is incorporated herein by reference.

Examples of such monomers and polymers include: bis (allyl carbonate)monomers, e.g., diethylene glycol bis(allyl carbonate), which monomer is sold under the trademark CR-39; polyol(meth)acryloyl terminated carbonate monomer; ethoxylated bisphenol A dimethacrylate monomers; ethylene glycol bismethacrylate monomers; poly(ethylene glycol)bis methacrylate monomers; urethane acrylate monomers; styrene; cellulose acetate; cellulose triacetate; cellulose acetate propionate and butyrate; poly(vinyl acetate); poly(vinyl alcohol); poly(vinyl chloride); poly(vinylidene chloride); polyurethanes, polythiourethanes, thermoplastic polycarbonates, such as the carbonate-linked resin derived from bisphenol A and phosgene, which is sold under the trademark LEXAN; polyesters, such as the material sold under the trademark MYLAR; poly(ethylene terephthalate); polyvinyl butyral; and poly(methyl methacrylate), such as the material sold under the trademark PLEXIGLAS.

More particularly contemplated, is the use of optically clear polymerizates, i.e., materials suitable for optical applications, such as optical elements, e.g., plano and vision correcting ophthalmic lenses, windows, clear polymeric films, automotive transparencies, e.g., windshields, aircraft transparencies, plastic sheeting, etc. Such optically clear polymerizates may have a refractive index that may range from about 1.48 to about 1.75, e.g., from about 1.495 to about 1.66. Specifically contemplated are optical elements made of copolymers and homopolymers or copolymers of a polyol(allyl carbonate).

Most particularly contemplated, is the use of the combination of the polymerizable compositions of the present invention with optical elements to produce photochromic articles.

Compatible (chemically and color-wise) tints, i.e., dyes, may be used in association with the films, coatings or overlays to achieve a more aesthetic result, for medical reasons, or for reasons of fashion. The particular dye selected will vary and depend on the aforesaid need and result to be achieved. In one embodiment, the dye may be selected to complement the color resulting from the activated photochromic substances, e.g., to achieve a more neutral color or absorb a particular wavelength of incident light. In another embodiment, the dye may be selected to provide a desired hue to the treated article when the photochromic substances is in an unactivated state.

In an example of a first contemplated embodiment of the present invention, a polymerizable composition is prepared by combining from 5 to 60 weight percent, based on the weight of the polymerizable composition, of the polymerizable anhydrides of the present invention, from 10 to 93 weight percent of acrylic monomers or oligomers, from 0 to 10 weight percent of a catalyst, and from 2 to 20 weight percent photochromic compound(s). The resulting polymerizable composition is applied by spin coating onto the surface of an optionally tinted/polarized lens, e.g., a lens prepared from a CR-39® monomer, having reactive groups on the surface selected from the group consisting of amino, hydroxyl, thiol and combinations thereof. The resulting layer is cured to produce an adherent photochromic layer having a thickness of approximately 20 microns.

In an example of a second contemplated embodiment of the present invention, a coating composition is prepared by dissolving from 1 to 20 weight percent, based on the weight of the coating composition, of the polymerizable isocyanates (i), (ii), (iii), (iv) and (v), and from 0 to 10 weight percent catalyst into from 70 to 99 weight percent of a solvent selected from the group consisting of methyl ethyl ketone, toluene, acetone or a combination thereof. The resulting coating composition is applied by spin coating onto the surface of an optionally tinted/polarized lens, e.g., a lens prepared from a CR-39® monomer, having reactive groups on the surface selected from the group consisting of amino, hydroxy, thio and combinations thereof. The resulting film is cured and a polymerizable coating composition comprising an acrylic functional monomer is applied by spin coating. The resulting layer is cured to produce an adherent layer having a thickness of approximately 20 microns.

In an example of a third contemplated embodiment of the present invention, a coating composition is prepared by combining from 90 to 100 weight percent, based on the weight of the coating composition, of the polymerizable anhydrides of the present invention and from 0 to 10 weight percent of a catalyst. The resulting coating composition is applied by spin coating onto the surface of an optionally tinted/polarized lens, e.g., a lens prepared from a CR-39® monomer, having reactive groups on the surface selected from the group consisting of amino, hydroxyl, thiol and combinations thereof. The resulting film is cured and a polymerizable coating composition comprising an acrylic functional monomer is applied to the cured film by spin coating. The resulting second layer is cured to produce an adherent layer having a thickness of approximately 20 microns.

In an example of a fourth contemplated embodiment, a predetermined volume of a polymerizable composition of from 1 to 10 weight percent, based on the weight of the composition, of anhydrides and/or isocyanates and from 90 to 99 weight percent of an acrylic functional monomer is dispensed into a volume defined by a spherical negative glass mold, which approximately matches the front surface curve (within ±0.05 diopters) and the outer diameter of an optionally tinted semi-finished single vision (SFSV) lens, fitted with a circular polyvinyl chloride gasket that extends 0.2 millimeters above the mold and has an inside diameter approximately 4 millimeters less than outside diameter of the glass mold. After the monomer is dispensed, the SFSV lens is carefully placed on the dispensed polymerizable composition which spreads to fill the defined volume. A circular glass plate having an outside diameter equal to or greater than that of the tinted lens is placed onto the rear surface of the tinted lens. A spring clamp is positioned so that one side of the clamp is on the front surface of the negative mold and other side of the clamp is on the back surface of the glass plate. The resulting assembly is sealed by taping the circumference of the plate-lens-gasket-mold using polyurethane tape. The assembly is preheated in an air oven for 30 minutes at 50° C., transferred into a waterbath maintained at 90 to 95° C. for 10 minutes and transferred to an air oven in which the temperature is increased from 95° C. to 125° C. and decreased to 82° C. over a 3 hour interval. The assembly is separated by inserting a wedge beneath the gasket between the lens and mold. The tinted lens now has an adherent layer of approximately 180 microns.

In an example of a fifth contemplated embodiment, the treated (optionally) tinted/polarized lens of the second contemplated embodiment is used in place of the optionally tinted lens in the fourth contemplated embodiment to produce an optionally tinted and polarized lens having combined adherent layers. In the examples of the second, third, fourth and fifth contemplated embodiments, photochromic compounds may be added to produce a photochromic layer.

The present invention is more particularly described in the following examples, which are intended as illustrative only, since numerous modifications and variations therein will be apparent to those skilled in the art. Identically numbered footnotes in the tables found in the examples refer to identical substances.

EXAMPLE 1

Composition A

The following materials were added in the order described to a suitable vessel equipped with an agitator.

| Material | Weight (Grams) |
| --- | --- |
| NMP[1] | 4.0 |
| Photochromic 1[2] | 0.9 |
| Photochromic 2[3] | 1.0 |
| Photochromic 3[4] | 0.1 |
| BAPO[5] | 0.1 |
| TMP TMA[6] | 3.0 |
| TMP 20EO TA[7] | 3.0 |
| BPA 2EO DMA[8] | 9.0 |
| PEG 600 PMA[9] | 5.0 |
| FC-431[10] | 0.02 |

[1]N-methylpyrrolidone solvent of 99 percent purity.
[2]A photochromic naphtho[1,2-b]pyran that exhibits a blue color when irradiated with ultraviolet light.
[3]A photochromic naphtho[1,2-b]pyran that exhibits a yellow color when irradiated with ultraviolet light.
[4]A photochromic naphtho[1,2-b]pyran different than Photochromic 2 that exhibits a yellow color when irradiated with ultraviolet light.
[5]IRGACURE 819 initiator, reported to be bis(2,4,6-benzoyl trimethyl) phenylphosphine oxide, available from Ciba Specialty Chemicals.
[6]Trimethylol propane triacrylate.
[7]Ethoxylated (20) trimethylol propane triacrylate.
[8]Ethoxylated (2) bisphenol A dimethacrylate.
[9]Polyethylene glycol (600) dimethacrylate.
[10]A fluorinated surfactant available from 3M.

After all of the materials were added to the vessel, the agitator was turned on and mixed for 60 minutes. The resulting solution was kept quiescent for about 24 hours or until it was substantially free of bubbles.

Composition B

N,N-Dimethyldodecyl amine (0.3 g) was added to a reaction flask containing methacrylic anhydride (10.0 g). The resulting mixture was stirred until a clean solution was obtained.

Treatment of Lens Blanks

Lens blanks prepared from CR-39® monomer were washed with dishwashing detergent and water, immersed in a 40 weight percent, based on the total weight of the solution, of an aqueous potassium hydroxide solution for 20 minutes; rinsed with deionized water; spin coated with the solution of Composition B at 1500 rpm for 10 sec.; heated at 100° C. for 10 minutes; rinsed with acetone; washed with dishwashing detergent and water, rinsed with isopropyl alcohol, coated with the solution of Composition A by spinning the lens at 1100 rpm for 7 seconds; subjected to 5 passes through a chamber on a conveyor belt at the speed of 3 feet per minute in nitrogen flushed atmosphere housing a 6 inch diameter ultraviolet light "type D" lamp from Fusion UV Systems, Inc., rated at 300 watts per inch.

Comparative Example 1

The procedure of Example 1 was followed except that the lenses were not immersed in a 40 weight percent aqueous potassium hydroxide solution for 20 minutes before further processing.

Comparative Example 2

The procedure of Example 1 was followed except that the lenses were not coated with the solution of Composition B or heated at 100° C. for 10 minutes.

Comparative Example 3

The procedure of Example 1 was followed except that the lenses were not immersed in a 40 weight percent aqueous potassium hydroxide solution for 20 minutes and were not coated with the solution of Composition B or heated at 100° C. for 10 minutes.

EXAMPLE 2

The adhesion of the coated lenses prepared in Example 1 and Comparative Examples (CE) 1, 2 and 3 was tested by using ASTM D-3359-93 Standard Test Method for Measuring Adhesion by Tape Test—Method B. A criss-cross pattern (grid) was scribed on the coated surface; and 3M #600 clear tape was pressed firmly against the grid and then removed in one quick motion. Adhesion testing was performed prior to immersing the lenses in boiling deionized water and after 60 minutes of immersion in the boiling water. The adhesion test results are listed in Table 1.

TABLE 1

| | Percentage of Adhesion Loss | |
|---|---|---|
| Example No. | Before Boiling | After Boiling |
| 1 | 0 | 0 |
| CE1 | 100 | 100 |
| CE2 | 100 | 100 |
| CE3 | 100 | 100 |

The results of Table 1 show that adherent polymeric layers were produced on the lenses of Example 1, while adherent layers were not produced in Comparative Examples 1, 2 and 3.

EXAMPLE 3

Step 1

An isophorone diisocyanate-hydroxyethyl methacrylate (IPDI-HEMA) adduct having a total solids content of approximately 83 weight percent was used. A procedure for preparing such a material is described by Antonucci, J. M., et al, "Isocyanato Urethane Methacrylates Derived from Hydroxyethyl Methacrylates", Journal of Dental Research, January 1980, pp. 35–43, which is incorporated herein by reference.

Step 2

The (IPDI-HEMA) adduct, 44 grams, of Step 1 was added to a reaction flask containing methyl ethyl ketone, 400 grams. The resulting mixture was stirred until a clear solution was obtained.

EXAMPLE 4

Part A

The following materials were added in the order and manner described to a suitable reaction vessel equipped with an agitator.

| MATERIAL | WEIGHT (grams) |
|---|---|
| CHARGE 1 | |
| Sartomer CD-540[1] | 22.5 |
| Polyethylene glycol (600) dimethacrylate | 7.5 |
| CHARGE 2 | |
| NMP[2] | 3 |
| Photochromic No. 1[3] | 2.4 |
| Vazo ®-52[4] | 0.6 |
| Sanduvor-3056[5] | 0.6 |
| Fluorad FC-431[6] | 0.09 |

[1]A bismethacrylate of ethoxylated 4,4'-isopropylindenediphenol having an average of 4 moles of ethylene oxide available from Sartomer Company.
[2]N-methyl pyrrolidone solvent of 99 percent purity.
[3]A naphtho [1,2-b] pyran that exhibits a blue color when irradiated with ultraviolet light.
[4]2,2'-azobis-(2,4-dimethylpentanenitrile) available from E. I. duPont de Nemours and Company.
[5]3-dodecyl-1-(1,2,2,6,6-pentamethyl-4-piperidinyl)-2,5-pyrrolidinedione available from Clariant Company.
[6]A fluorinated surfactant available from 3M.

Charge 1 was added to the reaction vessel, the agitator was turned on and mixed for 60 minutes. Charge 2 was added and the resulting mixture was stirred for an additional 60 minutes. The resulting solution was kept quiescent for about 24 hours or until it was substantially free of bubbles.

Part B

The following materials were added in the order and manner described to a suitable reaction vessel equipped with an agitator.

| MATERIAL | WEIGHT (grams) |
|---|---|
| CHARGE 1 | |
| Sartomer CD-540[1] | 15 |
| Polyethylene glycol (600) dimethacrylate | 5 |
| CHARGE 2 | |
| NMP[2] | 2 |
| Photochromic No. 1[3] | 1.6 |
| LUCIRIN ® TPO[7] | 0.6 |
| Sartomer-3056[5] | 0.4 |
| Fluorad ® FC-431[6] | 0.06 |

[7]2,4,6-trimethylbenzoyldiphenylphosphine oxide available from BASF.

Charge 1 was added to the reaction vessel, the agitator was turned on and mixed for 60 minutes. Charge 2 was added and the resulting mixture was stirred for an additional 60 minutes. The resulting solution was kept quiescent for about 24 hours or until it was substantially free of bubbles.

Part C

Lens blanks prepared from CR-39® monomer were immersed in a 40 weight percent, based on the total weight of the solution, of an aqueous potassium hydroxide solution for 20 minutes; rinsed with deionized water; immersed in the solution of Example 3 for 10 seconds; positioned 4 inches from a 900 watt infrared lamp for 90 seconds; rinsed with acetone; coated with the solution of Part A by spinning the lens at 1500 rpm for 10 seconds while applying the coating; placed in a vacuum chamber in which a residual pressure of 40 mm was attained within 2 minutes of pumping; back filling the vacuum chamber with nitrogen; and irradiating the coated lenses for 150 seconds with a 140 watt Infrared Bar lamp positioned about 1 inch (2.5 centimeters) above the lenses. The thickness of the layer on the lens was approximately 20 microns.

Part D

The procedure of Part C was followed except that the 10 lenses were spin coated with the solution of Part B by spinning the lens at 1500 rpm for 11 seconds while applying the coating and irradiated for 480 seconds with a Spectroline Blacklight Model B-100 lamp positioned about 3 inches (7.6 centimeters) above the lenses.

Part E

The adhesion of the coated lenses prepared in Parts C and D was tested by using ASTM D-3359-93 Standard Test Method for Measuring Adhesion by Tape Test—Method B. The tape used was 3M #600 clear tape. Testing was performed prior to immersing the lenses in boiling deionized water and after 60 minutes of immersion in the boiling water. The adhesion test results revealed no loss of the coating before or after immersion in the boiling water.

EXAMPLE 5

Part A

The following materials were added in the order and manner described to a suitable reaction vessel equipped with an agitator

| MATERIAL | WEIGHT PERCENT (based on the weight of the total composition) |
|---|---|
| CHARGE 1 | |
| CAS #29712-66-7[8] | 86 |
| Sartomer CD 9036[9] | 10 |
| Isocyanatoethylmethacrylate | 1.5 |
| VP Sanduvor PR-31[10] | 1 |
| Photochromic No. 1[3] | 1 |
| gamma-terpinine | 0.2 |
| CHARGE 2 | |
| VAZO ® 52[4] | 0.1 |
| LUPERSOL TBEC[11] | 0.2 |

[8]2,5,8,10,13-pentaoxahexadec-15-enoic acid, 15-methyl-9,14-dioxo-2[(2-methyl-1-oxo-2-propenyl)oxy]ethyl ester available from PPG Industries, Inc.
[9]A bismethacrylate of ethoxylated 4,4'-4,4'-isopropylindene-diphenol having an average of 30 moles of ethylene oxide available from Sartomer Inc.
[10]A multipurpose light stabilizer available from Clariant Company.
[11]t-butyl-(2-ethylhexyl)monoperoxycarbonate available from Atochem.

Charge 1 was added to the reaction vessel, maintained at a temperature of 65° C., the agitator was turned on and mixed from 10 to 20 minutes, until the Photochromic No. 1 was dissolved. The resulting solution was cooled to ambient temperature, e.g., about 23° C. Charge 2 was added and the resulting mixture was stirred until the initiators of Charge 2 were dissolved. The resulting solution was filtered through a 0.45 micron filter, and degassed at a pressure between 0.1 and 20 mm mercury from 10 to 60 minutes.

Part B

The procedure of Part A was followed except that the combination of dimethyl meta-isopropenyl benzyl isocyanate, 2.5 weight percent, and dibutyltindilaurate, 0.05 weight percent, were used in place of 1.5 weight percent of isocyanatoethylmethacrylate.

Part C

An aliquot of the solution of Part A, 0.84 ml, was dispensed onto an 80 mm–4.28 diopter (D) glass mold within a polyvinylchloride gasket of 76 mm OD×72 mm ID×0.190 mm thickness. A commercial Gray A polarized semi-finished single vision (SFSV) +4.25 D lens prepared from allyl diglycol carbonate monomer, and obtained from Younger Optics, which had been treated in a 12 weight percent, based on the total weight of the solution, aqueous sodium hydroxide solution maintained at 50° C. in a BRANSON 5200 ultrasonic bath for 3 minutes, was placed carefully onto the solution of Part A in the center of the mold. A +2.00 D glass mold was placed on the back of the polarized lens and pressure was applied so that the formulation spread and the lens came into contact with the gasket forming a seal.

The mold-lens-mold assembly was clamped using a conventional spring clamp. The perimeter of the assembly was taped using a polyurethane tape. The assembly was placed into a 60° C. oven for 30 minutes, transferred into a water bath at 90–95° C. for ten minutes and finally transferred into air oven for a 3 hour final cure cycle consisting of a 1.5 hour ramp from 95° C. to 125° C., maintained at 125° C. for 30 minutes and 1 hour ramp from 125° C. to 82° C. The assembly was removed from the oven, tape and backmold were removed and the polarized lens with photochromic overlay was separated from the front mold by gently sliding a thin metal piece (i.e., single-sided razor blade) under the PVC gasket and lifting with continuous pressure. The thickness of the resulting adherent layer was approximately 170±20 microns.

Part D

The procedure of Part C was followed except that the solution of Part B was used.

Part E

The procedure of Part C was followed except that charge 1 of Part A of this example did not contain Photochromic No. 1 and 80 mm (SFSV) +4.25 D lenses prepared from allyl diglycol carbonate monomer were tinted by immersion in a mixed dye bath maintained at 85 to 90° F. (29 to 32° C.) containing certain diluted Brain Power Inc. (BPI) Molecular Catalytic dye concentrates for a time interval to result in a spectrophotometrically obtained color reading of Y=25, a*=11 and b*=8, as defined in the CIELAB color system, measured using an Ultra Scan XE spectrophotometer.

One of the tinted lenses, Sample A, was heated at a temperature of from 110–120° C. for about 30 minutes before application of the photochromic overlay and another lens, Sample B, was not. The luminous transmittance, as described by the Y tristimulus value, and the color values, i.e., a* and b*, of the CIELAB color space for Samples A and B were collected before and after application of the overlay under the conditions of room temperature, i.e., 21 to 24° C., a $D_{65}$ illuminant and a 10 degree observer. The results reported as the change in values, i.e., ΔY, etc., are listed below in Table 2. The results reveal that a greater change in the luminous transmittance and a* value were measured for Sample B. This indicates that the Sample B lens, after application of the overlay, had an increase in transmittance, i.e., a reduction in the tint, and became less red in color.

TABLE 2

|  | ΔY | Δa* | Δb* |
|---|---|---|---|
| Sample A | 2.7 | −1.3 | 2.2 |
| Sample B | 3.6 | −3.3 | 2.1 |

Part F

The procedure of Part C was followed using the polymerizable composition of Part A, except that isocyanatoethylmethacrylate was left out.

Part G

The procedure of Part C was followed using the polymedizable composition of Part A, except that 2.5 weight percent of dimethyl meta-isopropenyl benzyl isocyanate, sold as TMI® (meta) unsaturated aliphatic isocyanate by Cytec Industries Inc., and 0.05 weight percent dibutyltindilaurate was used in place of 1.5 weight percent isocyanatoethylmethacrylate.

Part H

Adhesion testing on the lenses prepared in Example 5 was done by edging the lenses having an adherent layer with a conventional water cooled edger, e.g., an AIT Industries Super Dynamite™ Dial-A-Bevel™ Automatic Diamond Bevel Edging Machine, model Mark IV equipped with a standard 16 mm abrasive wheel operating at 3450 rpm with a water pressure between 15 and 30 psi or by a comparable edging technique. The edging process reduces the diameter of the lens by greater than or equal to 6 mm during one or more passes that take a minute or less to complete. Delamination of the photochromic layer was not observed during the edging process for lenses of Parts C, D, E and G but delamination was observed for the lenses of Part F either when the mold assembly was separated or during edging of the lenses. These results revealed that successful adherent layers on the lenses were produced when the compositions included the isocyanatoethylmethacrylate or the combination of dimethyl meta-isopropenyl benzyl isocyanate and dibutyltindilaurate.

The present invention has been described with, reference to specific details of particular embodiments thereof. It is not intended that such details be regarded as limitations upon the scope of the invention except insofar as to the extent that they are included in the accompanying claims.

We claim:

1. A process for producing an adherent polymeric layer on an organic polymeric substrate, which comprises the steps of:
   a. treating the surface of said polymeric substrate to provide reactive groups at said surface;
   b. applying to the surface of the treated substrate a polymerizable composition consisting essentially of a composition selected from the group consisting of:
      (i) organic anhydride(s) having at least one polymerizable ethylenic linkage;
      (ii) isocyanate(s) selected from the group consisting of:
         (a) isocyanate represented by the following general formula:

$CH_2=C(Y)-C(O)OR'-N=C=O$ wherein Y is selected from the group consisting of hydrogen and $C_1-C_5$ alkyl; and R' is a $C_1-C_{20}$ alkylene or phenylene;
         (b) m-isopropenyl-α, α-dimethyl benzyl isocyanate;
         (c) product of the reaction of acrylic functional monomer(s) containing a vinyl ether group and isocyanic acid;
         (d) product of the reaction of unsaturated monomer(s) having a functional group selected from the group consisting of amino, hydroxy, thio and a combination of said functional groups and isocyanate(s) having at least two functional isocyanate groups; and
         (e) mixtures of these isocyanates; and
      (iii) combination(s) of (i) and (ii); and
   c. curing the applied polymerizable composition.

2. The process of claim 1 wherein the organic anhydride is selected from the group consisting of acrylic anhydride, methacrylic anhydride, maleic anhydride, itaconic anhydride and mixtures of these anhydrides.

3. The process of claim 1 wherein the process further comprises the steps of applying to the cured composition of step c a further polymerizable composition substantially free of organosiloxanes comprising at least 5 weight percent, based on the total weight of said composition, of nonfunctional unsaturated monomer(s) and curing said applied composition.

4. The process of claim 3 wherein the further polymerizable composition contains an adhesion improving amount of isocyanate(s) selected from the group consisting of:
   (a) isocyanate represented by the following general formula:

$CH_2=C(Y)-C(O))R'-N=C=O$ wherein Y is selected from the group consisting of hydrogen and $C_1-C_5$ alkyl; and R' is a $C_1-C_{20}$ alkylene or phenylene;
   (b) m-isopropenyl-α, α-dimethyl benzyl isocyanate:;
   (c) product of the reaction of acrylic functional monomer(s) containing a vinyl ether group and isocyanic acid;
   (d) product of the reaction of unsaturated acrylic monomer(s) having a functional group selected from the group consisting of amino, hydroxy, thio and a combination of said functional groups and isocyanate(s) having at least two functional isocyanate groups, and
   (e) mixtures of these isocyanates.

5. The process of claim 3 further comprising treating the surface of the cured composition of step c to remove any excess adhesion promoting layer material prior to application of the further polymerizable composition.

6. The process of claim 3 wherein the further polymerizable composition contains from 0.01 to 10 weight percent, based on the total weight of the composition, of catalyst.

7. The process of claim 6 wherein the further polymerizable composition further contains from 0.1 to 40 weight percent, based on the total weight of the composition, of photochromic compound(s).

8. The process of claim 7 wherein the organic polymeric substrate is a solid transparent polymer selected from the group consisting of poly(methyl methacrylate), poly (ethylene glycol bismethacrylate), poly(ethoxylated bisphenol A dimethacrylate), thermoplastic polycarbonate poly (vinyl acetate), polyvinylbutyral, polyurethane, polythiourethanes, and polymers of members of the group consisting of diethylene glycol bis(allyl carbonate) monomers, diethylene glycol dimethacrylate monomers, ethoxyylated bis phenol methacrylate monomers, diisopropenyl benzene monomers, ethoxylated trimechylol propane triacrylate monomers and mixtures thereof.

9. The process of claim 8 wherein the solid transparent polymer is an optically clear polymerizate having a refractive index of from 1.48 to 1.75.

10. The process of claim 9 wherein the optically clear polymerizate is a lens.

11. The process of claim 1 wherein the organic polymeric substrate is a tinted or tinted and polarized substrate, and the process further comprises heating said tinted or tinted and polarized substrate for a tint-stabilizing length of time prior to step a.

12. The process of claim 1 wherein the organic polymeric substrate is a solid transparent polymer selected from the group consisting of poly(methyl methacrylate), poly (ethylene glycol bismethacrylate), poly(ethoxylated bisphenol A dimethacrylate), thermoplastic polycarbonate, poly (vinyl acetate), polyvinylbutyral, polyurethane, polythiourethanes, and polymers of members of the group consisting of diethylene glycol bis(allyl carbonate) monomers, diethylene glycol dimethacrylate monomers, ethoxylated bisphenol methacrylate monomers, diisopropenyl benzene monomers, ethoxylated trimethylol propane triacrylate monomers and mixtures thereof.

13. The process of claim 12 wherein the solid transparent polymer is an optically clear polymerizate having a refractive index of from 1.48 to 1.75.

14. The process of claim 13 wherein the optically clear polymerizate is an optical element.

15. A process for producing an adherent polymeric layer on an organic polymeric substrate, which comprises the steps of:
   a. treating the surface of said polymeric substrate to provide reactive groups at said surfacer
   b. applying to the surface of the treated substrate a polymerizable composition consisting essentially of from 0.01 to 10 weight percent, based on the total weight of the composition, of catalyst and an adhesion improving amount of a composition selected from the group consisting of:
      (i) organic anhydride(s) having at least one polymerizable ethylenic linkage;
      (ii) isocyanate(s) selected from the group consisting of:
         (a) isocyanate represented by the following general formula:

$CH_2=C(Y)-C(O)OR'-N=C=O$ wherein Y is selected from the group consisting of hydrogen and $C_1-C_5$ alkyl; and R' is a $C_1-C_{20}$ alkylene or phenylene;
         (b) m-isopropenyl-α, α-dimethyl benzyl isocyanate;
         (c) product of the reaction of acrylic functional monomer(s) containing a vinyl ether group and isocyanic acid;
         (d) product of the reaction of unsaturated monomer (s) having a functional group selected from the group consisting of amino, hydroxy, thio and a combination of said functional groups and isocyanate(s) having at least two functional isocyanate groups; and
         (e) mixtures of these isocyanates; and
      (iii) combination(s) of (i) and (ii); and
   c. curing the applied polymerizable composition.

16. The process of claim 15 wherein the process further comprises the steps of applying to the cured composition of step c a further polymerizable composition substantially free of organosiloxanes comprising at least 5 weight percent, based on the total weight of said composition, of non-functional unsaturated monomer(s) and curing said applied composition.

17. The process of claim 16 further comprising treating the surface of the cured composition of step c to remove any excess adhesion promoting layer material prior to application of the further polymerizable composition.

18. The process of claim 15 wherein the organic polymeric substrate is a solid transparent polymer selected from the group consisting of poly(methyl methacrylate), poly (ethylene glycol bismethacrylate), poly(ethoxylated bisphenol A dimethacrylate), thermoplastic polycarbonate, poly (vinyl acetate), polyvinylbutyral, polyurethane, polythiourethanes, and polymers of members of the group consisting of diethylene glycol bis(allyl carbonate) monomers, diethylene glycol dimethacrylate monomers, ethoxylated bisphenol methacrylate monomers, diisopropenyl benzene monomers, ethoxylated trimethylol propane triacrylate monomers and mixtures thereof.

19. The process of claim 18 wherein the solid transparent polymer is an optically clear polymerizate having a refractive index of from 1.48 to 1.75.

20. The process of claim 19 wherein the optically clear polymerizate is an optical element.

21. A process for producing an adherent polymeric layer on an organic polymeric substrate, which comprises the steps of:
   a. treating the surface of said polymeric substrate to provide reactive groups at said surface;
   b. applying to the surface of the treated substrate a polymerizable composition consisting essentially of at least 5 weight percent, based on the total weight of said composition, of non-functional unsaturated monomer (s), from 0.1 to 40 weight percent, based on the total weight of the composition, of photochromic compound (s), from 0.01 to 10 weight percent, based on the total weight of the composition, of catalyst and an adhesion improving amount of the isocyanate(s) selected from the group consisting of:
      (i) isocyanate represented by the following general formula:

$CH_2=C(Y)-C(O)OR'-N=C=O$ wherein Y is selected from the group consisting of hydrogen and $C_1-C_5$ alkyl; and R' is a $C_1-C_{20}$ alekylene or phenylene;
      (ii) m-isopropenyl-α, α-dimethyl benzyl isocyanate;
      (iii) product of the reaction of acrylic functional monomer(s) containing a vinyl ether group and isocyanic acid;
      (iv) product of the reaction of unsaturated monomer(s) having a functional group selected from the group consisting of amino, hydroxy, thio and a combination of said functional groups and isocyanate(s) having at least two functional isocyanate groups; and
      (v) mixtures of these isocyanates; and
   c. curing the applied polymerizable composition.

22. The process of claim 21 wherein the photochromic compounds are selected from the group consisting of benzopyrans, naphthopyrans, spiro(indoline)benzoxazines, spiro(indoline)pyridobenzoxazines, metal-dithizonate, fulgides, fulgimides and mixtures thereof.

23. The process of claim 21 wherein the organic polymeric substrate is a tinted or tinted and polarized substrate and the process further comprises heating said tinted or tinted and polarized substrate for a tint-stabilizing length of time prior to step a.

24. The process of claim 21 wherein the organic polymeric substrate is a solid transparent polymer selected from the group consisting of poly(methyl methacrylate), poly(ethylene glycol bismethacrylate), poly(ethoxylated bisphenol A dimethacrylate), thermoplastic polycarbonate, poly(vinyl acetate), polyvinylbutyral, polyurethane, polythiourethanes, and polymers of members of the group consisting of diethylene glycol bis(allyl carbonate) monomers, diethylene glycol dimethacrylate monomers, ethoxylated bisphenol methacrylate monomers, diisopropenyl benzene monomers, ethoxylated trimethylol propane triacrylate monomers and mixtures thereof.

25. The process of claim 24 wherein the solid transparent polymer is an optically clear polymerizate having a refractive index of from 1.48 to 1.75.

26. The process of claim 25 wherein the optically clear polymerizate is an optical element.

27. A process for producing an adherent polymeric layer on an organic polymeric substrate, which comprises the steps of:

a. treating the surface of said polymeric substrate to provide reactive groups at said surface;

b. applying to the surface of the treated substrate a polymerizable composition consisting essentially of at least 5 weight percent, based on the total weight of said composition, of non-functional unsaturated monomer(s) and an adhesion improving amount of an isocyanate(s) selected from the group consisting of:

(i) isocyanate represented by the following general formula:

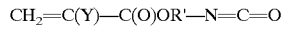

$CH_2{=}C(Y){-}C(O)OR'{-}N{=}C{=}O$ wherein Y is selected from the group consisting of hydrogen and $C_1$–$C_5$ alkyl; and R' is a $C_1$–$C_{20}$ alkylene or phenylene;

(ii) m-isopropenyl-α, α-dimethyl benzyl isocyanate;

(iii) product of the reaction of acrylic functional monomer(s) containing a vinyl ether group and isocyanic acid;

(iv) product of the reaction of unsaturated monomer(s) having a functional group selected from the group consisting of amino, hydroxy, thio and a combination of said functional groups and isocyanate(s) having at least two functional isocyanate groups; and (v) mixtures of these isocyanates; and c. curing the applied polymerizable composition.

28. A product of the process of claim 1.

29. A product of the process of claim 27.

30. A product of the process of claim 15.

31. A product of the process of claim 21.

32. A product of the process of claim 10.

* * * * *